US011453615B2

(12) United States Patent
Asahi et al.

(10) Patent No.: US 11,453,615 B2
(45) Date of Patent: Sep. 27, 2022

(54) DIELECTRIC THIN FILM, DIELECTRIC ELEMENT AND ELECTRONIC CIRCUIT BOARD

(71) Applicant: TDK CORPORATION, Tokyo (JP)

(72) Inventors: Toshio Asahi, Tokyo (JP); Masamitsu Haemori, Tokyo (JP); Hitoshi Saita, Tokyo (JP); Masahito Furukawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 52 days.

(21) Appl. No.: 17/189,859

(22) Filed: Mar. 2, 2021

(65) Prior Publication Data

US 2021/0292244 A1 Sep. 23, 2021

(30) Foreign Application Priority Data

Mar. 18, 2020 (JP) .............................. JP2020-048054

(51) Int. Cl.
*C04B 35/58* (2006.01)
*H01G 4/12* (2006.01)
*H01G 4/008* (2006.01)

(52) U.S. Cl.
CPC ....... *C04B 35/58014* (2013.01); *H01G 4/008* (2013.01); *H01G 4/1227* (2013.01); *C04B 2235/3886* (2013.01); *C04B 2235/781* (2013.01)

(58) Field of Classification Search
CPC . C04B 2235/781; H01G 4/008; H01G 4/1227
See application file for complete search history.

(56) References Cited

U.S. PATENT DOCUMENTS

| 2015/0353430 | A1* | 12/2015 | Natsui | ................... | C01G 49/00 |
| | | | | | 252/62.9 PZ |
| 2021/0110974 | A1* | 4/2021 | Haemori | .................. | H01G 4/10 |
| 2021/0276868 | A1* | 9/2021 | Asahi | ..................... | H05K 1/162 |

FOREIGN PATENT DOCUMENTS

JP 2001-135143 A 5/2001

* cited by examiner

*Primary Examiner* — Nathan Milakovich
(74) *Attorney, Agent, or Firm* — Oliff PLC

(57) ABSTRACT

A dielectric thin film contains Ca, Sr, Ti, Hf, O and N, wherein among crystal grains existing in a plane field of view of 1 μm square perpendicular to a film thickness direction of the dielectric thin film, a number ratio of crystal grains having a grain size of 19 nm or more and less than 140 nm is 95% or more, among the crystal grains existing in the plane field of view, a number ratio of first crystal grains having a grain size of 65 nm or more and less than 77 nm is 20% or more, and among the crystal grains existing in the plane field of view, a number ratio of second crystal grains having a grain size of 19 nm or more and less than 54 nm is 40% or less.

10 Claims, 13 Drawing Sheets

DIELECTRIC THIN FILM, DIELECTRIC ELEMENT AND ELECTRONIC CIRCUIT BOARD

BACKGROUND OF THE INVENTION

Field of the Invention

The present invention relates to a dielectric thin film, a dielectric element, and an electronic circuit board.

Description of the Related Art

JP-A-2001-135143 discloses an invention relating to a dielectric thin film, and discloses that the dielectric thin film has a perovskite structure and contains nitrogen in the perovskite structure. JP-A-2001-135143 discloses that it is possible to provide a dielectric thin film that can be manufactured at low cost even on a substrate having low heat resistance while maintaining a good dielectric property due to the presence of nitrogen.

At present, it is required to provide a dielectric thin film having a higher specific permittivity and a higher insulation resistance at a high temperature.

SUMMARY OF THE INVENTION

An object of the present invention is to provide a dielectric thin film having a high specific permittivity and a high insulation resistance at a high temperature.

A dielectric thin film according to the present invention is a dielectric thin film containing Ca, Sr, Ti, Hf, O and N, in which among crystal grains existing in a plane field of view of 1 μm square perpendicular to a film thickness direction of the dielectric thin film, a number ratio of crystal grains having a grain size of 19 nm or more and less than 140 nm is 95% or more, among the crystal grains existing in the plane field of view, a number ratio of first crystal grains having a grain size of 65 nm or more and less than 77 nm is 20% or more, and among the crystal grains existing in the plane field of view, a number ratio of second crystal grains having a grain size of 19 nm or more and less than 54 nm is 40% or less.

The dielectric thin film according to the present invention has a high specific permittivity and a high insulation resistance at a high temperature.

The dielectric thin film according to the present invention contains a main component represented by a composition formula $(Sr_{1-x}Ca_x)_m(Ti_{1-y}Hf_y)O_{3-\delta}N_\delta$, in which $0<x\leq0.15$, $0<y\leq0.15$, $0.90\leq m\leq1.15$, and $0<\delta\leq0.05$ may be satisfied.

A dielectric element according to the present invention includes the above dielectric thin film.

The dielectric thin film may be formed on an electrode, and the electrode may be at least one selected from the group consisting of Pt, Ni, Cu and Pd.

An electronic circuit board according to the present invention includes the above dielectric element.

DETAILED DESCRIPTION OF THE PREFERRED EMBODIMENTS

Figure 1:
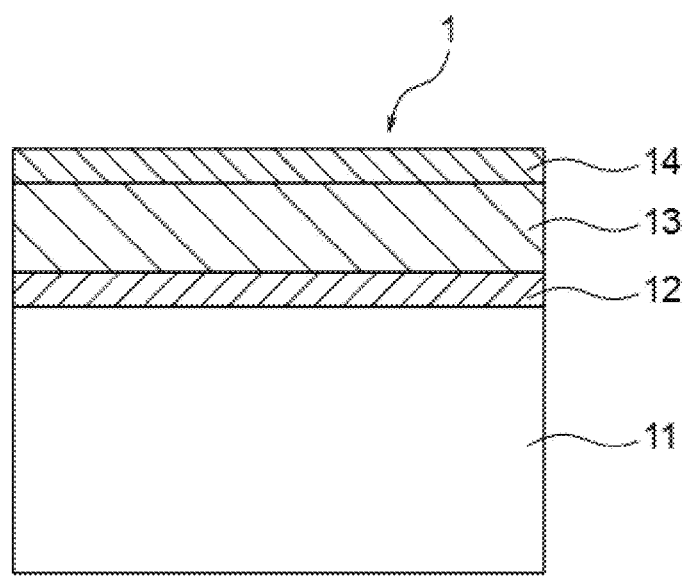
FIG. 1 is a schematic view of a thin film capacitor according to an embodiment of the present invention.

Hereinafter, the present invention will be described based on embodiments shown in the drawings.

(Thin Film Capacitor)

FIG. 1 shows a schematic view of a thin film capacitor according to the present embodiment. The thin film capacitor is a kind of a dielectric element. A thin film capacitor 1 shown in FIG. 1 includes a first electrode 12 formed on a substrate 11, a dielectric thin film 13 formed on the first electrode 12, and a second electrode 14 formed on a surface of the dielectric thin film 13. The thin film capacitor 1 does not have to include the substrate 11. For example, a metal foil such as a Ni foil may be used as the first electrode 12, and the dielectric thin film 13 may be formed on the metal foil.

A material of the substrate 11 is not particularly limited, and a Si single crystal substrate may be used as the substrate 11, and in this case, availability and cost are excellent.

Materials of the first electrode 12 and the second electrode 14 are not particularly limited as long as the first electrode 12 and the second electrode 14 function as electrodes. Examples thereof include Pt, Ni, Cu, Pd and Ag, and Pt, Ni, Cu and Pd are preferred. When the first electrode 12 is formed on the substrate 11, a thickness of the first electrode 12 is not particularly limited as long as the first electrode 12 functions as an electrode, and the thickness is preferably 0.1 µm or more and 1.0 µm or less. When the substrate 11 is not provided and the metal foil such as Ni is used for the first electrode 12, the thickness is not particularly limited as long as the first electrode 12 functions as the electrode, and is preferably 1 µm to 100 µm.

The dielectric thin film 13 of the present embodiment contains Ca, Sr, Ti, Hf, O and N. A composition of the dielectric thin film 13 of the present embodiment is not particularly limited, and the dielectric thin film 13 preferably contains a main component represented by a composition formula $(Sr_{1-x}Ca_x)_m(Ti_{1-y}Hf_y)O_{3-\delta}N_\delta$.

The composition formula represents an atomic number ratio of respective elements. Further, it is preferable that the above main component has a perovskite structure in which an A-site element is Sr and Ca and a B-site element is Ti and Hf.

The above x may satisfy $0<x\leq0.15$ or $0.01\leq x\leq0.15$.
The above y may satisfy $0<y\leq0.15$ or $0.01\leq y\leq0.15$.
The above $\delta$ may satisfy $0<\delta\leq0.05$, $\delta$ may be 0.01 or more, and $\delta$ is preferably 0.03 or less.

Elements other than the above elements described in the above composition formula may be contained as an impurity, or may be contained within a range that does not significantly impair a specific permittivity and an insulation resistance at a high temperature. Specifically, the other elements may be contained in an amount of 5% by mass or less, assuming that the entire dielectric thin film is 100% by mass.

A method for analyzing the composition of the dielectric thin film 13 is not particularly limited. For example, electron spectroscopy for chemical analysis (ESCA) can be used to analyze the composition of a portion several nm deep from the surface. In the dielectric thin film 13 of the present embodiment, the composition can be analyzed by waveform-separating a narrow scan spectrum of N1s in particular. ESCA is sometimes called X-ray photoelectron spectroscopy (XPS).

Figure 2:
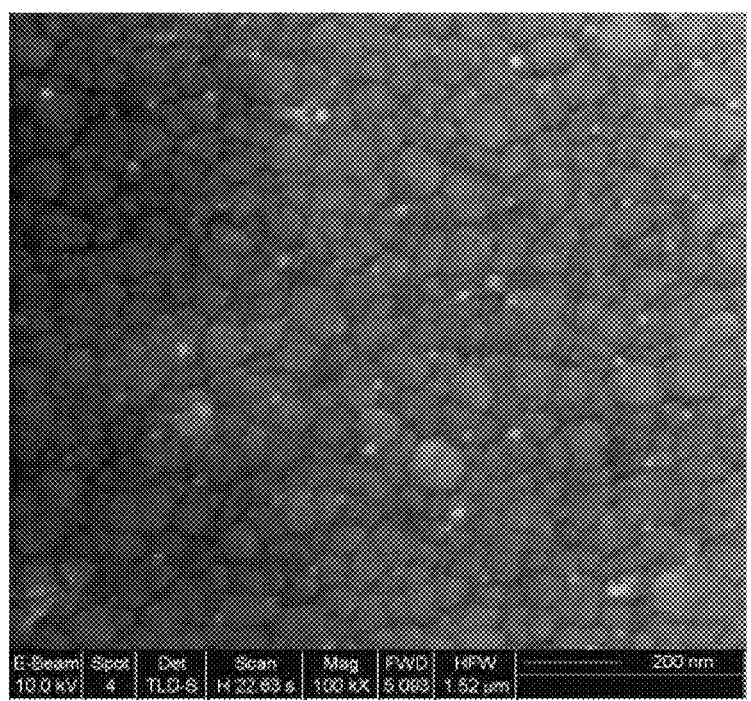
FIG. 2 is a photograph taken by a scanning electron microscope (SEM) on a plane perpendicular to a film thickness direction of a dielectric thin film according to an embodiment of the present invention.

FIG. 2 is a photograph taken by a scanning electron microscope (SEM) on a plane perpendicular to a film thickness direction of the dielectric thin film 13 according to the present embodiment. Specifically, FIG. 2 is an SEM photograph on the plane perpendicular to the film thickness direction of the dielectric thin film 13 obtained by scraping the electrode formed on the dielectric thin film 13. Therefore, in FIG. 2, a part of the electrode remaining without being scraped can be confirmed as white dots. The white dots as the electrode are not counted as crystal grains when measuring a grain size distribution below.

As shown in FIG. 2, crystal grains having various grain sizes are existing in the plane perpendicular to the film thickness direction of the dielectric thin film 13 of the present embodiment. In the present embodiment, among crystal grains existing in a plane field of view of 1 µm square (1 µm×1 µm) perpendicular to the film thickness direction of the dielectric thin film 13, a number ratio of crystal grains having a grain size of 19 nm or more and less than 140 nm is 95% or more.

In the present embodiment, the grain size of the crystal grain is an equivalent circle diameter of the crystal grain. That is, a diameter of a circle having the area same as that of the crystal grain is defined as the grain size of the crystal grain.

The grain sizes and the number ratio of the crystal grains on the plane perpendicular to the film thickness direction of the dielectric thin film 13, that is, the grain size distribution can be measured by, for example, acquiring an SEM image with a scanning electron microscope (SU3900 manufactured by Hitachi High-Tech) and then performing grain size analysis with grain size analysis software (Mac-View version 4.0 manufactured by Mountech).

In the present embodiment, "the plane perpendicular to the film thickness direction of the dielectric thin film 13" may be a cross section of the dielectric thin film 13 or the surface of the dielectric thin film 13.

Figure 3:
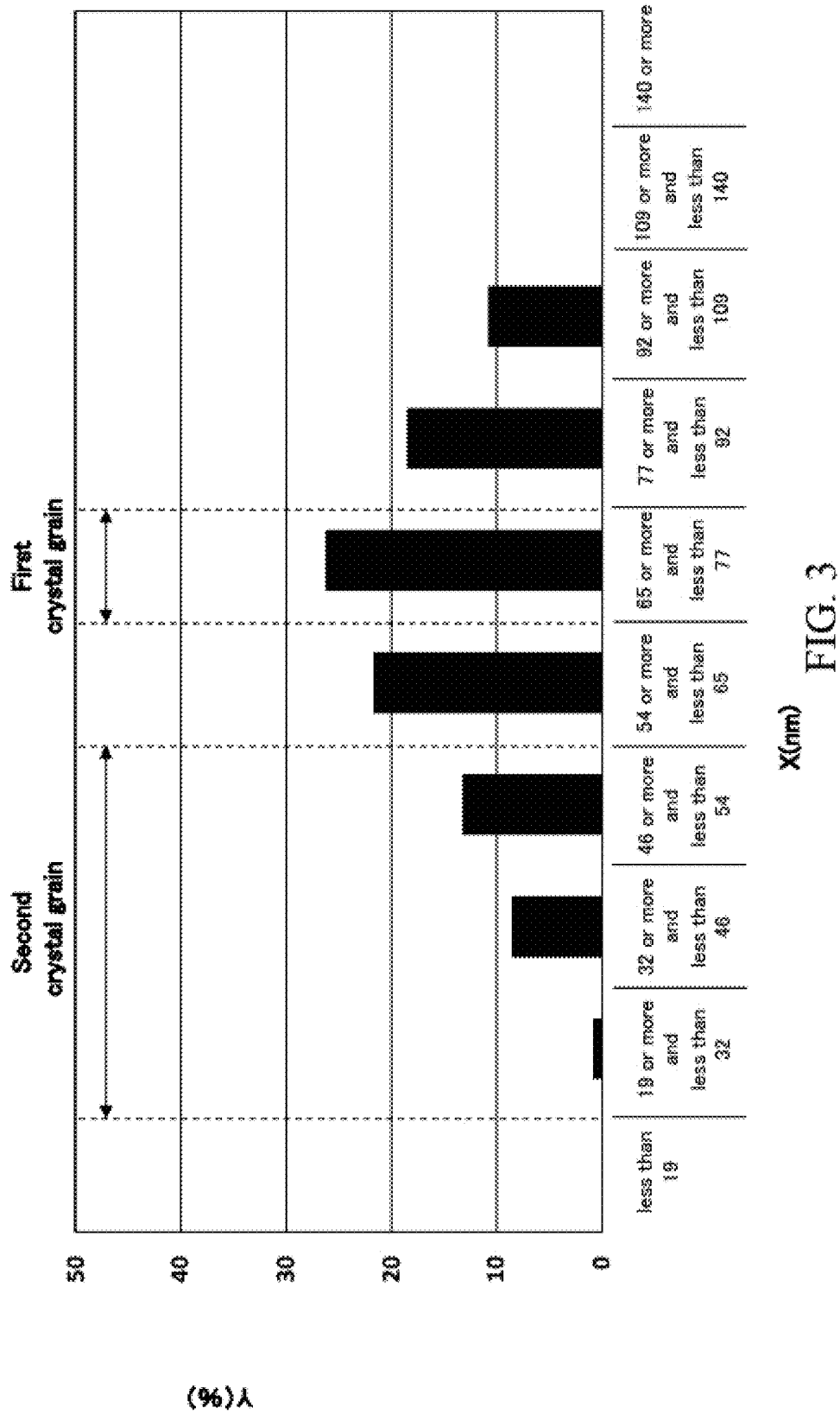
FIG. 3 is a graph showing a grain size distribution on a plane perpendicular to a film thickness direction of a dielectric thin film according to Example 2 of the present invention.
Figure 4:
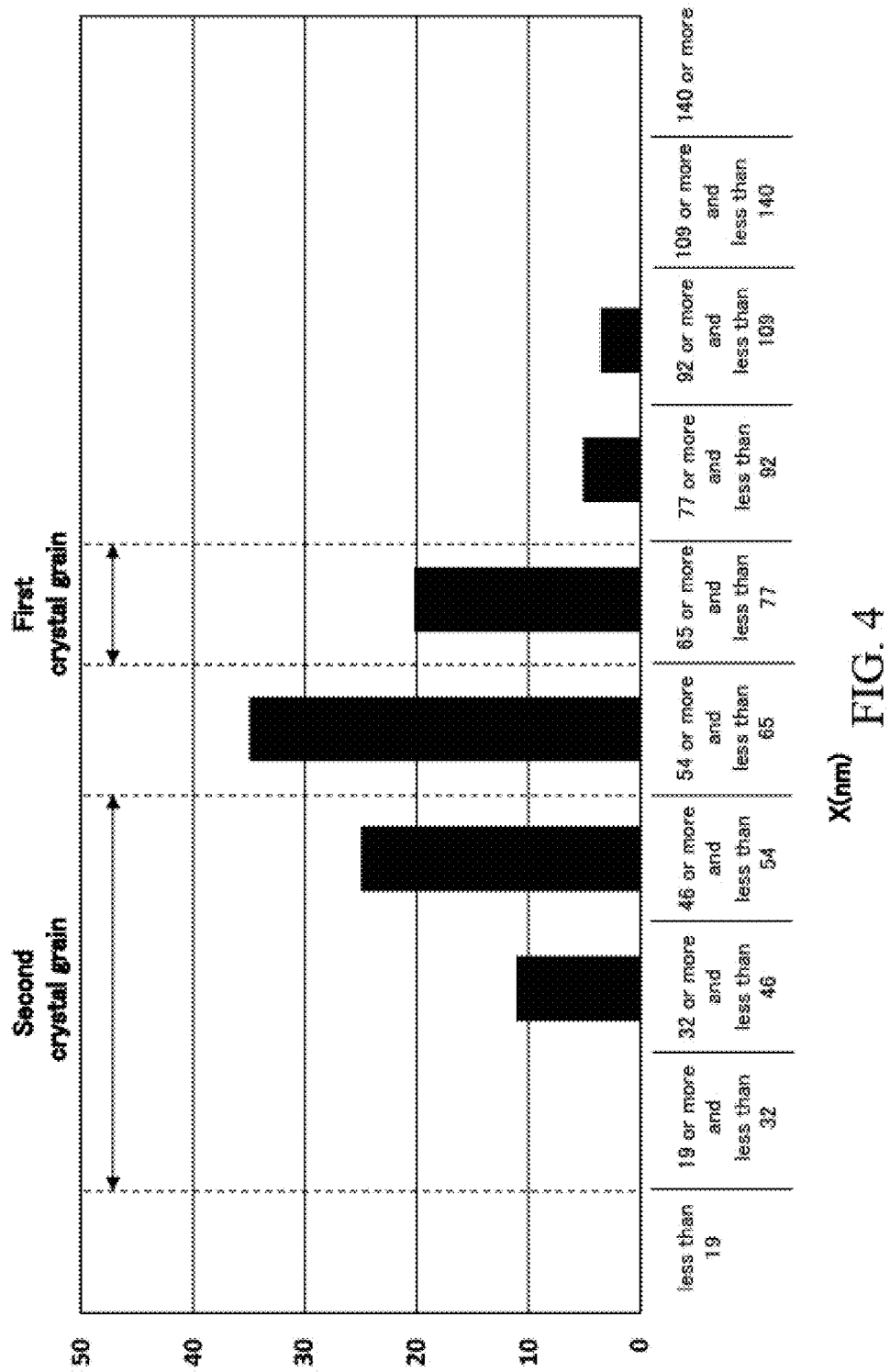
FIG. 4 is a graph showing a grain size distribution on a plane perpendicular to a film thickness direction of a dielectric thin film according to Example 20 of the present invention.
Figure 5:
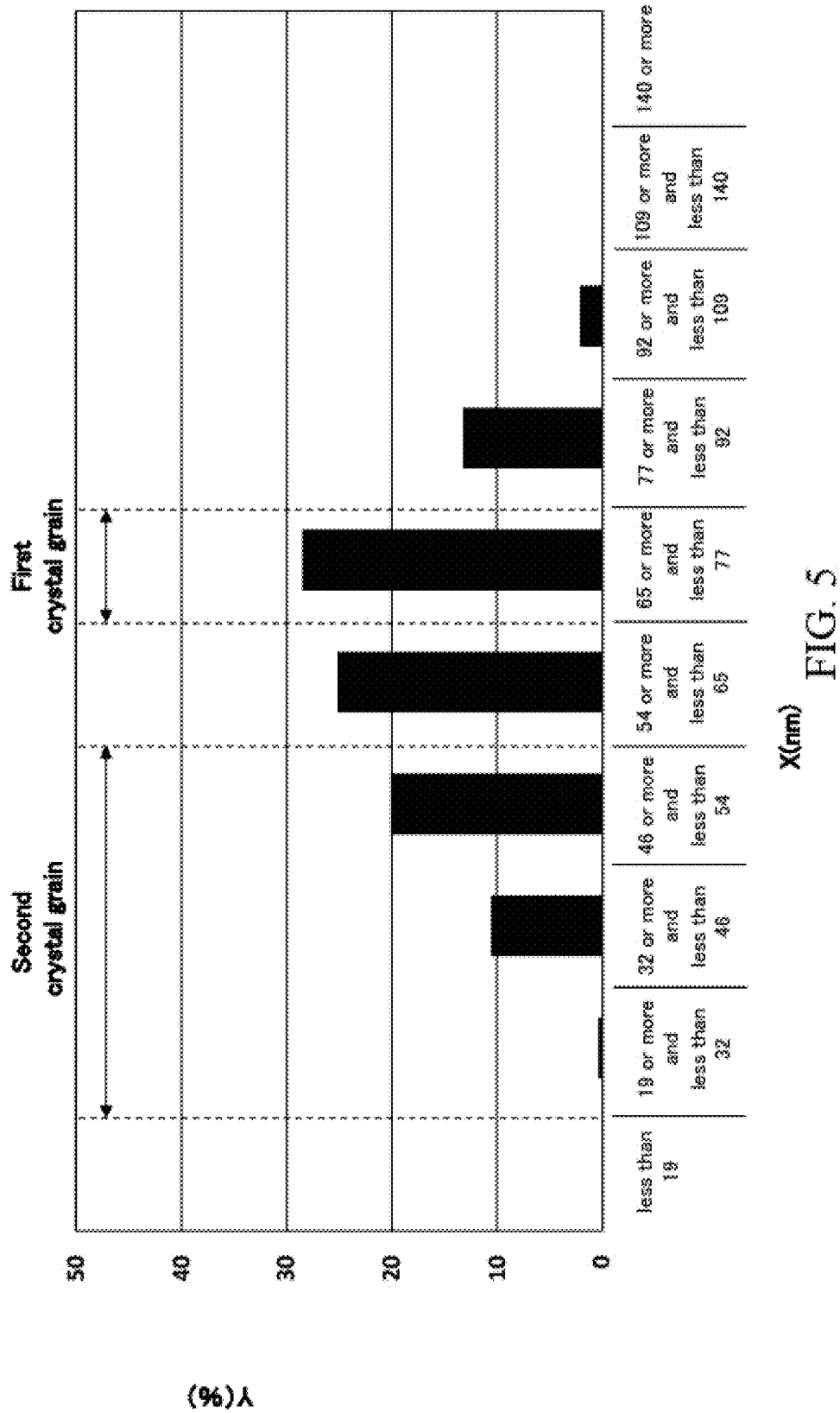
FIG. 5 is a graph showing a grain size distribution on a plane perpendicular to a film thickness direction of a dielectric thin film according to Example 1 of the present invention.

FIGS. 3 to 5 show the grain size distribution of the crystal grains existing in the field of view of 1 µm square on the plane perpendicular to the film thickness direction of the dielectric thin film 13 of the present embodiment. Specifically, an X-axis represents the grain size of the crystal grains, and a Y-axis represents the number ratio of the crystal grains.

As shown in FIGS. 3 to 5, in the present embodiment, among the crystal grains existing in the above field of view, a number ratio of first crystal grains having a grain size of 65 nm or more and less than 77 nm is 20% or more, and preferably 20% or more and 60% or less.

In addition, in the present embodiment, among the crystal grains existing in the above field of view, a number ratio of second crystal grains having a grain size of 19 nm or more and less than 54 nm is 40% or less, and preferably 1% or more and 40% or less.

In the present embodiment, a peak of the grain size distribution of the crystal grains preferably appears at a position where the grain size is 60 nm or more, and more preferably a position where the grain size is 60 nm or more and 90 nm or less.

The present inventors have found that, when the grain size distribution on the plane perpendicular to the film thickness direction of the dielectric thin film 13 satisfies the above conditions, the dielectric thin film 13 has a high specific permittivity and a high insulation resistance at a high temperature.

The reason thereof is not clear, but the following points can be considered. That is, it is considered that, when the grain size distribution of the crystal grains satisfies the above conditions, a dielectric property can be sufficiently exhibited as compared with a grain size distribution in which the crystal grains are too small. In addition, it is considered that, when the grain size distribution of the crystal grains satisfies the above conditions, generation of cracks, which is considered to be one of causes of a leak current, is prevented as compared with a grain size distribution in which the crystal grains are too large. Therefore, it is considered that, when the grain size distribution on the plane perpendicular to the film thickness direction of the dielectric thin film 13 satisfies the above conditions, the dielectric thin film 13 has a high specific permittivity and a high insulation resistance at a high temperature.

The dielectric thin film 13 may be a polycrystalline film or a single crystal film. A thickness of the dielectric thin film 13 is not particularly limited. The thickness may be 30 nm to 1000 nm or 30 nm to 600 nm.

(Electronic Circuit Board)

An electronic circuit board according to the present embodiment includes the above dielectric thin film. The electronic circuit board may include an electronic component such as the thin film capacitor containing the above dielectric thin film. The electronic component such as the thin film capacitor may be installed on a surface of the electronic circuit board. The electronic component such as the thin film capacitor may be embedded in the electronic circuit board.

Figure 6A:
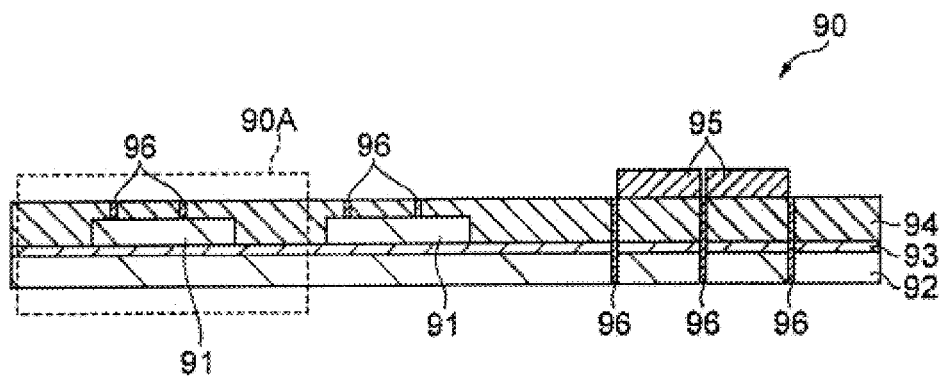
FIG. 6A is a schematic cross-sectional view of an electronic circuit board according to an embodiment of the present invention.
Figure 6B:
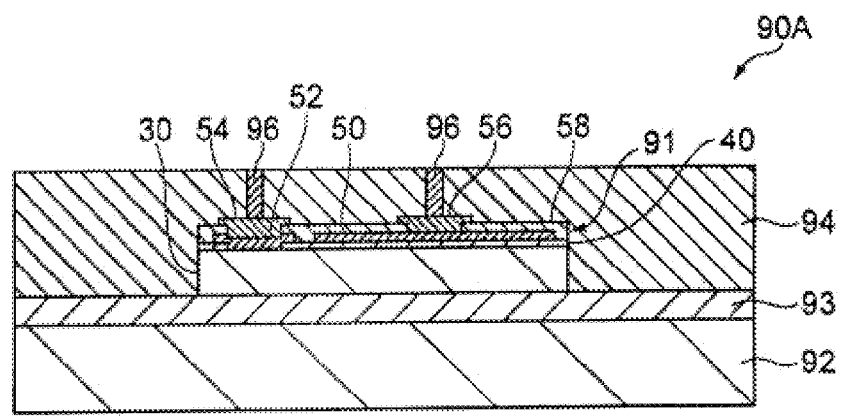
FIG. 6B is a partially enlarged view of the electronic circuit board shown in FIG. 6A.

An example of the electronic circuit board according to the present embodiment is shown in FIGS. 6A and 6B. As shown in FIG. 6A, an electronic circuit board 90 includes a resin substrate 92, a resin layer 93 covering the resin substrate 92, and thin film capacitors 91 installed on a surface of the resin layer 93 opposite to the resin substrate 92.

The electronic circuit board 90 may further include an insulating coating layer 94 covering the resin layer 93 and the thin film capacitor 91, an electronic component 95 installed on the insulating coating layer 94, and a plurality of metal wires 96.

At least a part of the metal wires 96 may be drawn out to a surface of the resin substrate 92 or the insulating coating layer 94. At least a part of the metal wires 96 may be connected to extraction electrodes 54, 56 of the thin film capacitor 91, or to an electronic component 95. At least a part of the metal wires 96 may penetrate the electronic circuit board 90 in a direction from a front surface to a back surface of the electronic circuit board 90. A material of the resin substrate 92 is not particularly limited. For example, the resin substrate 92 may be an epoxy resin substrate made of an epoxy resin.

FIG. 6B is an enlarged schematic view of a portion denoted by 90A in FIG. 6A. As shown in FIG. 6B, the thin film capacitor 91 included in the electronic circuit board according to the present embodiment includes a first electrode 30, a dielectric thin film 40 provided on a surface of the first electrode 30, and a second electrode 50 provided on a part of a surface of the dielectric thin film 40 opposite to the first electrode 30. The thin film capacitor 91 may further include a through hole electrode 52 provided on the surface of the first electrode 30 through a portion of the dielectric thin film 40 where the second electrode 50 is not provided, an insulating resin layer 58, the extraction electrode 54, and the extraction electrode 56.

The second electrode 50, the dielectric thin film 40, and the through hole electrode 52 may be covered with the insulating resin layer 58. The extraction electrode 54 may be provided directly on a surface of the through hole electrode 52 through the insulating resin layer 58. The extraction electrode 56 may be provided directly on a surface of the second electrode 50 through the insulating resin layer 58.

Method for Manufacturing Thin Film Capacitor

Next, a method for manufacturing the thin film capacitor 1 will be described.

A method of forming a thin film that finally functions as the dielectric thin film 13 is not particularly limited. Examples thereof include a vacuum deposition method, a sputtering method, a pulse laser deposition method (PLD method), an organic metal chemical vapor deposition method (MO-CVD), an organic metal decomposition method (MOD), a sol-gel method, and a chemical solution deposition method (CSD). Further, raw materials used for film formation may contain minute impurities and auxiliary components, but there is no particular problem as long as the amount does not significantly impair a performance of the thin film.

When a film is formed by a method such as the PLD method, the sputtering method, or the CSD method among the above film forming methods, a finally obtained thin film tends to be a polycrystalline film. Although synthesis is possible by the CVD method, the PLD method and the sputtering method have higher composition controllability. In the present embodiment, a film forming method by using the PLD method will be described.

First, a Si single crystal substrate is prepared as the substrate 11. Next, the first electrode 12 is formed on the Si single crystal substrate. A method of forming the first electrode 12 is not particularly limited. For example, a sputtering method or a CVD can be mentioned. A metal foil such as a Ni foil may be used as the first electrode 12 without preparing the substrate 11. When the Ni foil is used as the first electrode 12, there is an advantage that the first electrode 12 can be easily mounted on an electronic circuit.

Next, a metal oxide thin film is formed on the first electrode 12 by the PLD method. If necessary, a metal mask may be used to form a region where a part of the thin film is not formed to expose a part of the first electrode 12.

In the PLD method, first, a target containing constituent elements of a target dielectric thin film, that is, Sr, Ti, Ca, and Hf, is installed in a film forming chamber. Next, a surface of the target is irradiated with a pulsed laser. A strong energy of the pulsed laser instantly evaporates the surface of the target. Then, evaporates are deposited on the substrate 11 or the first electrode 12 arranged so as to face the target, a dielectric thin film (a metal oxide thin film) containing the main component represented by the composition formula $(Sr_{1-x}Ca_x)_m(Ti_{1-y}Hf_y)O_3$ is formed.

The type of the target is not particularly limited, and a metal oxide sintered body containing the constituent elements of the metal oxide thin film to be produced can be used. In the present embodiment, examples include oxides of Sr, Ti, Ca, and Hf, composite oxides such as $SrTiO_3$ and $CaHfO_3$, or metal compounds that form oxides of each metal element by sintering. In addition, it is preferable that each element is evenly distributed in the target, but a distribution may vary within a range that does not influence a quality of a finally obtained dielectric thin film. Further, the number of the target does not necessarily to be one, and a plurality of targets containing a part of the constituent elements of the metal oxide thin film can be prepared and used for film formation.

A shape of the target is not limited, and may be suitable for a film forming apparatus to be used. Further, m of the metal oxide thin film can be controlled by adjusting film forming conditions (oxygen gas pressure, nitrogen gas pressure, a size of the film forming chamber, a position of gas introduction tube, etc.). For example, m in a formed film can be changed by changing m of the target. Not only m of the target but also the film forming conditions are important. This is because the metal element evaporated from the target by the pulse laser is influenced by elements constituting an atmosphere in the film forming chamber and reaches a film forming surface of the substrate 11 or the first electrode 12.

Further, in the PLD method, the substrate 11 and/or the first electrode 12 may be heated by an infrared laser at the time of film formation in order to crystallize the formed metal oxide thin film. A heating temperature for the substrate 11 and/or the first electrode 12 varies depending on the constituent elements and compositions of the metal oxide thin film and the substrate 11, and is preferably 300° C. to 800° C., for example. By setting a temperature of the substrate 11 to an appropriate temperature, the metal oxide thin film can be easily crystallized and cracks that occur during cooling can be prevented.

Next, a Ni thin film is formed on the dielectric thin film by a method such as a PLD method, a sputtering method, or a CSD method, and then reduction firing is performed. At this time, a density of the formed Ni thin film is preferably 70% to 99%, and a film thickness of the Ni thin film is preferably in the range of 10 nm to 500 nm.

The higher the density of the formed Ni thin film, the larger the grain size of the crystal grains tends to be. Further, the thicker the film thickness of the formed Ni thin film, the larger the grain size of the crystal grains tends to be.

The density of the Ni thin film and the film thickness of the Ni thin film on the dielectric thin film can be controlled by adjusting a film forming pressure, a density of the target, a film forming power, a film forming time, and the like.

By controlling the density and the film thickness of the Ni thin film formed on the dielectric thin film, it is possible to control the grain size distribution of the crystal grains of the dielectric thin film during the reduction firing. The reason is considered to that a grain growth of the crystal grains of the dielectric thin film is controlled by an influence of a linear expansion of the Ni thin film in contact with the dielectric thin film.

A method of the reduction firing is not particularly limited. For example, the dielectric thin film can be nitrided, and δ, which indicates a ratio of N, can be adjusted by reduction-firing the dielectric thin film in a nitrogen gas-containing atmosphere or an ammonia gas-containing atmosphere in a state where the dielectric thin film and carbon are arranged close to each other. Since adjustment of a value of δ and strong nitridation are easy, it is preferable to set the ammonia gas-containing atmosphere in the present embodiment.

In the present embodiment, it is more preferable that an atmospheric gas contains 1.0 vol % to 10.0 vol % of ammonia gas. An oxygen partial pressure in the nitrogen gas-containing atmosphere and/or the ammonia gas-containing atmosphere during the reduction firing is not particularly limited. For example, oxygen partial pressure may be $1 \times 10^3$ Pa or less.

A method of arranging the dielectric thin film and carbon close to each other is not particularly limited. Examples thereof include a method using a firing furnace in which at least a part is made of carbon, a method of charging carbon (a shape is not particularly limited) into the firing furnace, a method of charging the dielectric thin film into a container in which at least a part is made of carbon and performing firing. Further, two or more of the above methods may be used in combination. In addition, the above carbon is not limited to a carbon simple substance, and may be a carbon compound.

A lower limit of a firing temperature during the reduction firing is not particularly limited as long as the temperature is sufficient for the reduction firing. An upper limit of the firing temperature during the reduction firing is not particularly limited as long as the first electrode and the dielectric thin film do not melt. The firing temperature during the reduction firing may be, for example, 400° C. or higher and 1000° C. or lower, and preferably 600° C. or higher and 900° C. or lower. A firing time during the reduction firing is not particularly limited. For example, the firing time may be 30 minutes or longer and 300 minutes or shorter.

Finally, the Ni thin film formed on the dielectric thin film 13 can be removed by etching or the like and then forming the second electrode 14 on the dielectric thin film 13, to manufacture the thin film capacitor 1. The material of the second electrode 14 is not particularly limited, and Pt, Pd, Ag, Au, Cu, Ni and the like can be used. When Ni is used for the electrode 14, the Ni thin film formed on the dielectric thin film 13 may not be removed and may be used as the electrode 14, and a Ni thin film may be further formed on the electrode 14. Further, a method of forming the second electrode 14 is not particularly limited, and for example, the second electrode 14 can be formed by a sputtering method.

Method for Manufacturing Electronic Circuit Board

Next, a method for manufacturing the electronic circuit board 90 will be described with reference to FIGS. 6A and 6B.

The method for manufacturing the electronic circuit board 90 is not particularly limited. For example, the electronic circuit board 90 may be manufactured by the following method. First, a surface of the resin substrate 92 is covered with an uncured resin layer. The uncured resin layer is a precursor of the resin layer 93. The thin film capacitor 91 is installed on a surface of the uncured resin layer. At this time, the first electrode 30 of the thin film capacitor 91 is made to face the uncured resin layer.

Next, the thin film capacitor 91 is sandwiched between the resin substrate 92 and the insulating coating layer 94 by covering the uncured resin layer and the thin film capacitor 91 with the insulating coating layer 94. Next, the resin layer 93 is formed by thermosetting the uncured resin layer.

Next, the insulating coating layer 94 is pressure-bonded to the resin substrate 92, the thin film capacitor 91, and the resin layer 93 by hot pressing to form a laminated substrate. Next, a plurality of through holes penetrating the laminated substrate are formed. Then, the metal wires 96 are formed in respective through holes. After forming the metal wires 96, the electronic component 95 is installed on the surface of the insulating coating layer 94. By the above method, the electronic circuit board 90 in which the thin film capacitor 91 is embedded can be obtained.

A material of each metal wire 96 is not particularly limited. For example, the metal wire 96 may be made of a conductor such as Cu. A material of the uncured resin layer is not particularly limited. For example, the uncured resin layer may be a B-stage thermosetting resin. The type of the thermosetting resin is not particularly limited. For example, the thermosetting resin may be an epoxy resin or the like. The B-stage thermosetting resin is not completely cured at room temperature, and is completely cured by heating. A material of the insulating coating layer 94 is not particularly limited. For example, the insulating coating layer 94 may be an epoxy resin, a polytetrafluoroethylene resin, or a polyimide resin.

The electronic component 95 is not particularly limited, and for example, an IC chip can be used.

Although the embodiments of the present invention have been described above, the present invention is not limited to such embodiments, and it goes without saying that the present invention can be implemented in various different modes without departing from the gist of the present invention.

Figure 13:
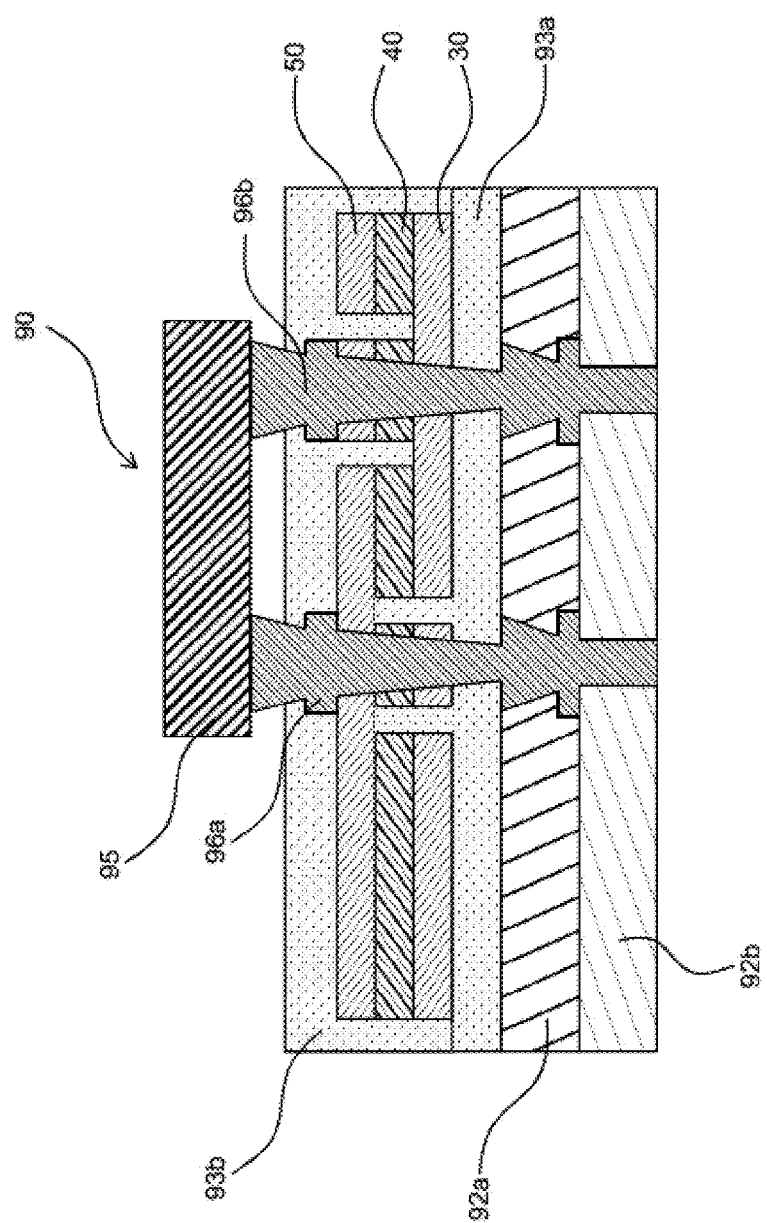
FIG. 13 is a schematic cross-sectional view of an electronic circuit board according to another embodiment of the present invention.

For example, the above-mentioned dielectric thin film can be used for the dielectric thin film 40 of an electronic circuit board 90a shown in FIG. 13. In FIG. 13, the dielectric thin film 40 is sandwiched between the first electrode 30 and the second electrode 50. A through-hole type extraction electrode 96a and the second electrode 50 are electrically connected to each other, and a through-hole type extraction electrode 96*b* and the first electrode 30 are electrically connected each other.

In addition, the through-hole type extraction electrode 96*a* and the first electrode 30 are insulated to each other by an insulating resin layer 93*a*. Similarly, the through-hole type extraction electrode 96*b* and the second electrode 50 are insulated each other by an insulating resin layer 93*b*.

The dielectric element according to the present invention is an element utilizing a dielectric property, and includes a capacitor, a thermistor, a filter, a diplexer, a resonator, a transmitter, an antenna, a piezoelectric element, a transistor, a ferroelectric memory, and the like. The dielectric thin film according to the present embodiment is particularly preferably used for a power supply decoupling capacitor.

The electronic circuit board according to the present invention includes the above-mentioned dielectric element. The electronic circuit board according to the present invention is particularly preferably used for an IC package and an electronic substrate module.

EXAMPLES

Hereinafter, the present invention will be described based on more detailed Examples, but the present invention is not limited to these Examples.

Experimental Example 1

First, a $SrCO_3$ powder, a $CaCO_3$ powder, a $TiO_2$ powder, and an $HfO_2$ powder were prepared as raw materials for a sintered body used as a film forming target. Each powder was weighed such that x, y and m were values shown in Table 1 or Table 2 in the finally obtained dielectric thin film.

Next, powders were mixed for 16 hours in a wet ball mill using water or ethanol as a solvent to obtain a mixed slurry.

Next, the mixed slurry was dried at 80° C. for 12 hours in a constant temperature dryer to obtain a mixture.

Next, the mixture was lightly crushed in a mortar and charged into a ceramic crucible. Then, the crushed mixture was heat-treated at 700° C. to 1000° C. for 2 hours to 5 hours in an air atmosphere using an electric furnace to obtain a calcined product.

Next, the calcined product was crushed in the mortar and then finely pulverized in the wet ball mill using water or ethanol as a solvent for 16 hours to obtain a calcined slurry.

The obtained calcined slurry was dried at 80° C. for 12 hours in a constant temperature dryer to obtain a finely pulverized powder.

A polyvinyl alcohol solution was added as a binder to the finely pulverized powder and mixed to obtain a granulated powder. An addition amount of the polyvinyl alcohol solution was 0.6% by mass with respect to 100% by mass of the finely pulverized product.

The granulated product was molded into a disc shape having a diameter of about 23 mm and a thickness of about 9 mm to obtain a molded product. The molded product was uniaxial press molded, and then CIP molded.

The molded product was debindered at 400° C. to 600° C. in the air atmosphere using the electric furnace, and then fired at 1200° C. to 1400° C. for 4 hours to 10 hours to obtain a sintered product. Further, an upper surface and a lower surface of the sintered product were mirror-polished to obtain a film forming target having a height of 5 mm. It was confirmed that a relative density of the obtained film forming target was 96% to 98%.

The film forming target obtained as described above was installed in a film forming apparatus, and finally the Ni foil functioning as the first electrode was installed so as to face the film forming target. The thickness of the Ni foil was 30 μm.

Next, the dielectric thin film (metal oxide thin film) was formed on the first electrode by the PLD method so as to have a thickness of 200 nm. At this time, by adjusting the film forming conditions, m of the obtained metal oxide thin film was controlled. A time required for film formation was 0.5 hours to 2 hours.

Next, the Ni thin film was formed on the dielectric thin film by sputtering. At this time, the density of the formed Ni thin film was 85% to 95%, and the film thickness of the Ni thin film was 50 nm to 500 nm.

The dielectric thin film was nitrided by reducing and firing the dielectric thin film in the ammonia gas-containing atmosphere in the state where the dielectric thin film and carbon were arranged close to each other. By using a graphite sheet, the dielectric thin film and carbon were arranged close to each other.

As described above, the Ni thin film was formed on the dielectric thin film and then reduction-fired to control δ, the number ratio of the first crystal grains, and the number ratio of the second crystal grains to values shown in the following table. The firing temperature during the reduction firing was 700° C. or higher and 900° C. or lower. The firing time during reduction firing was 30 minutes or longer and 300 minutes or shorter. In addition, the oxygen partial pressure in the ammonia gas-containing atmosphere during the reduction firing was set to $1 \times 10^3$ Pa or less.

Subsequently, the second electrode was formed by further sputtering a Ni thin film on the Ni thin film formed on the dielectric thin film.

The specific permittivity and the insulation resistance at a high temperature of 125° C. were measured for the obtained dielectric thin film.

After obtaining, with the scanning electron microscope (SU3900 manufactured by Hitachi High-Tech), a SEM image of field of view of 1 μm square on a plane perpendicular to a film thickness direction of a dielectric thin film obtained by scraping the second electrode formed on the dielectric thin film, and performing grain size analysis using grain size analysis software (Mac-View version 4.0 manufactured by Mountech), the grain size distribution was measured. In all Examples and Comparative Example in Tables 1 and 2, the number ratio of the crystal grains having a grain size of 19 nm or more and less than 140 nm was 95% or more among the crystal grains existing in the above field of view.

Figure 7:
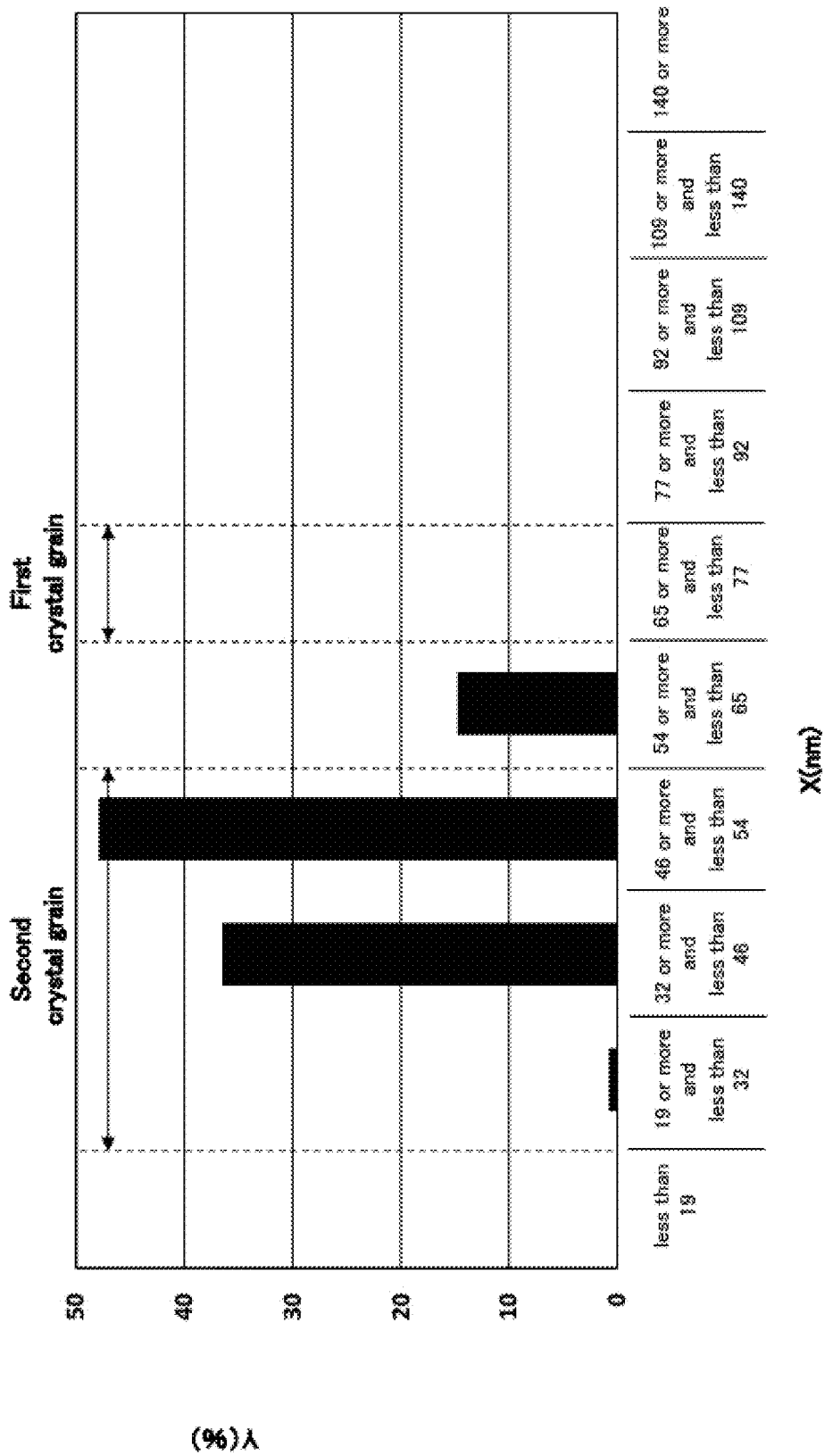
FIG. 7 is a graph showing a grain size distribution on a plane perpendicular to a film thickness direction of a dielectric thin film according to Comparative Example 5 of the present invention.
Figure 8:
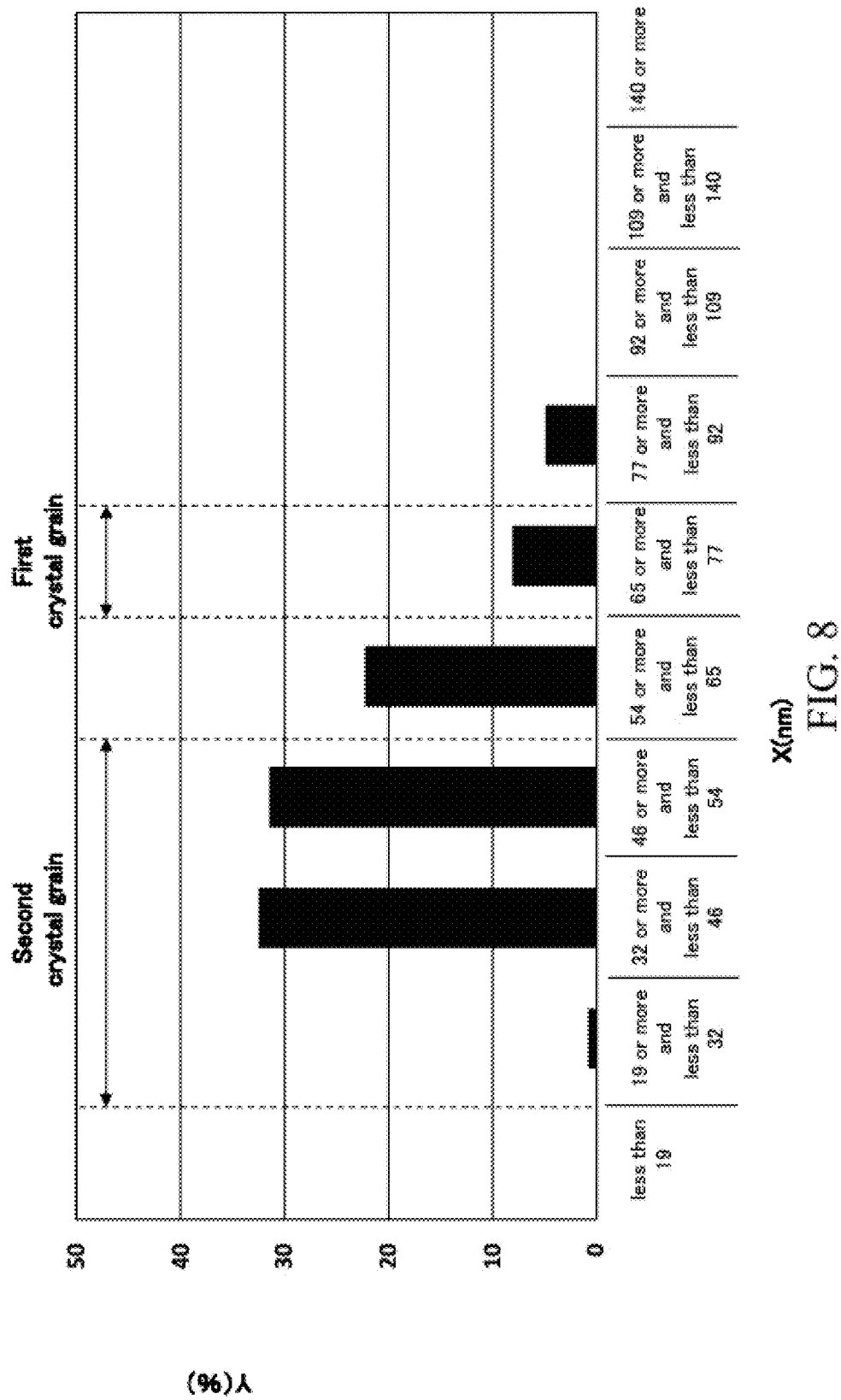
FIG. 8 is a graph showing a grain size distribution on a plane perpendicular to a film thickness direction of a dielectric thin film according to Comparative Example 6 of the present invention.
Figure 9:
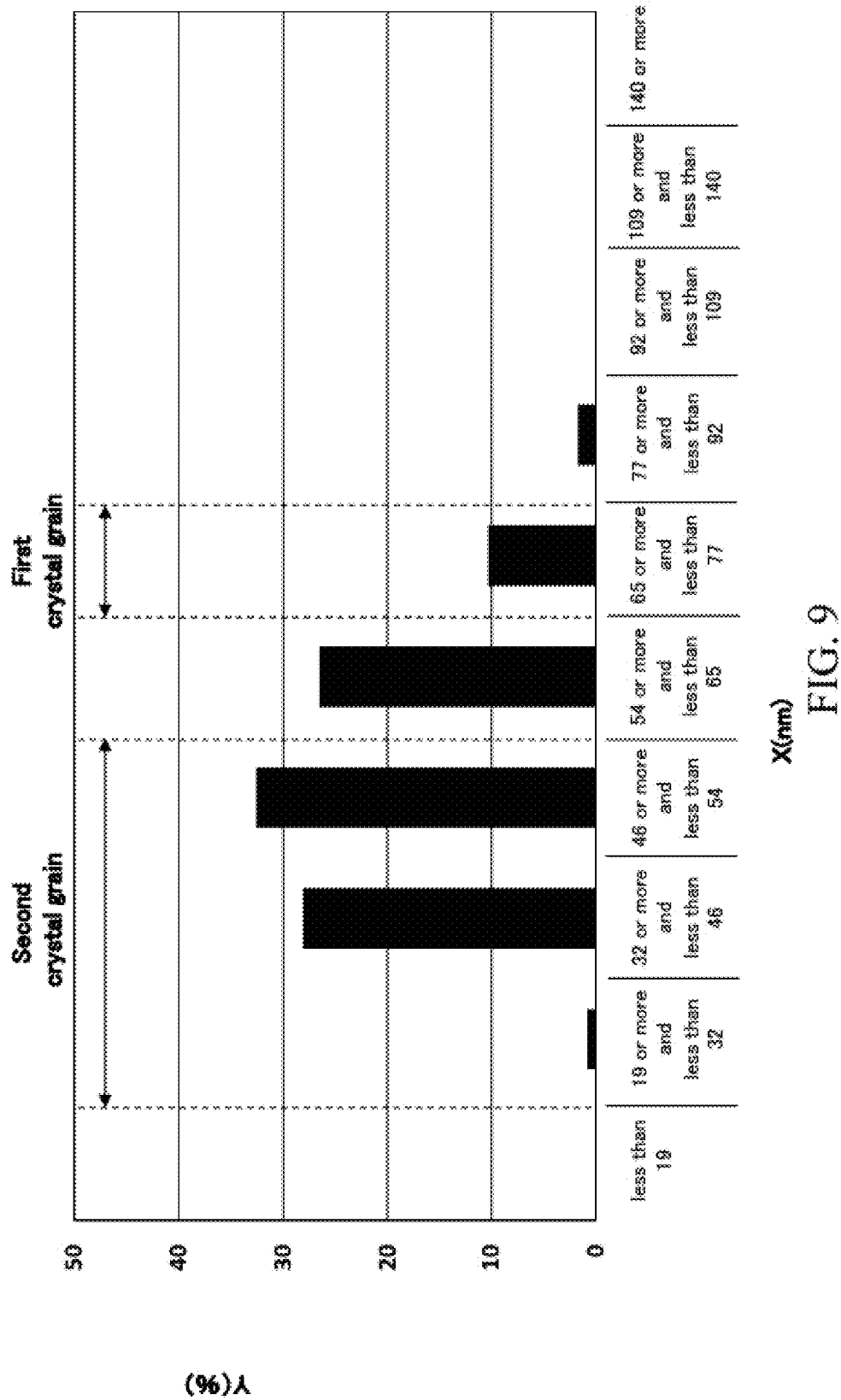
FIG. 9 is a graph showing a grain size distribution on a plane perpendicular to a film thickness direction of a dielectric thin film according to Comparative Example 1 of the present invention.
Figure 10:
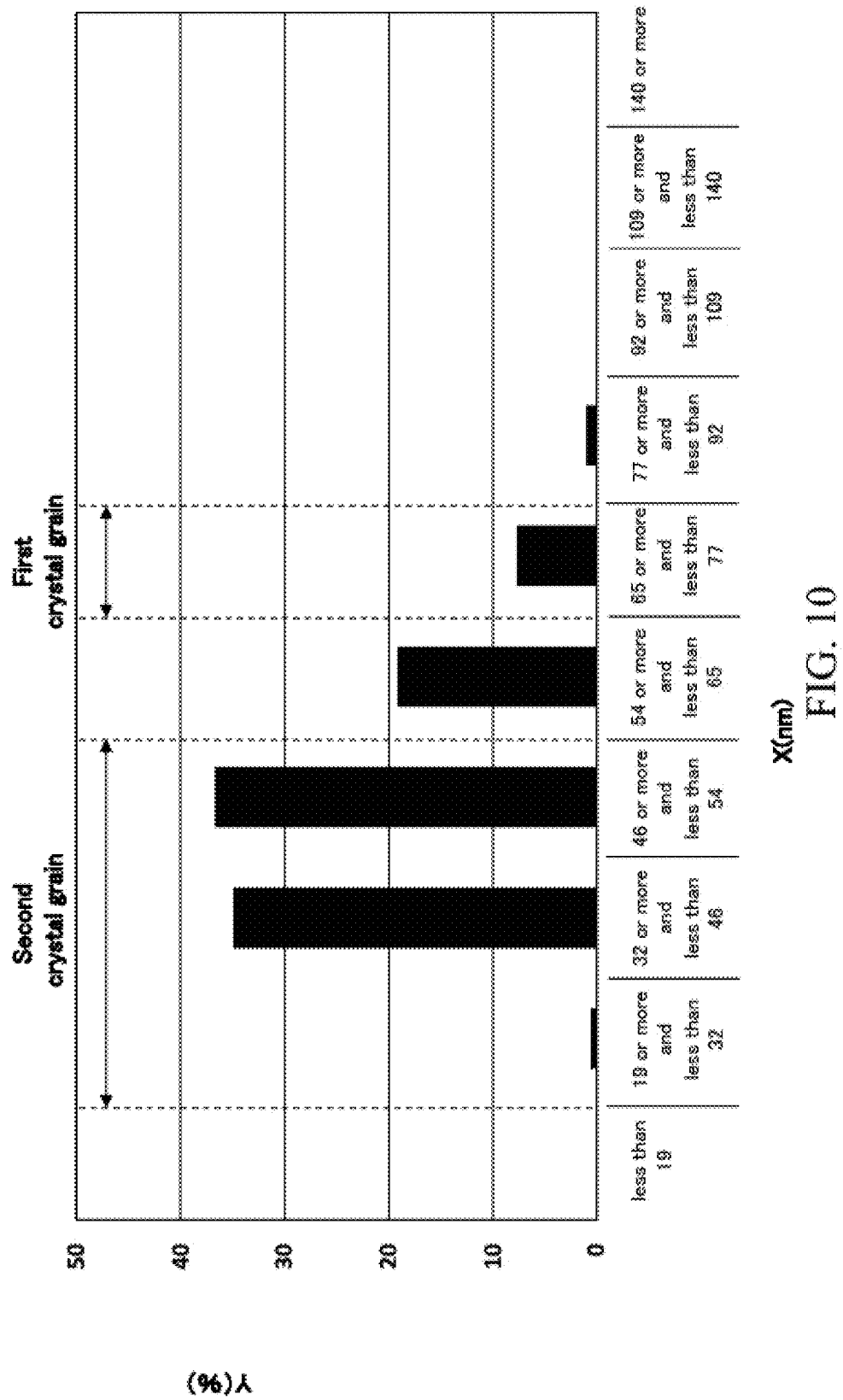
FIG. 10 is a graph showing a grain size distribution on a plane perpendicular to a film thickness direction of a dielectric thin film according to Comparative Example 7 of the present invention.
Figure 11:
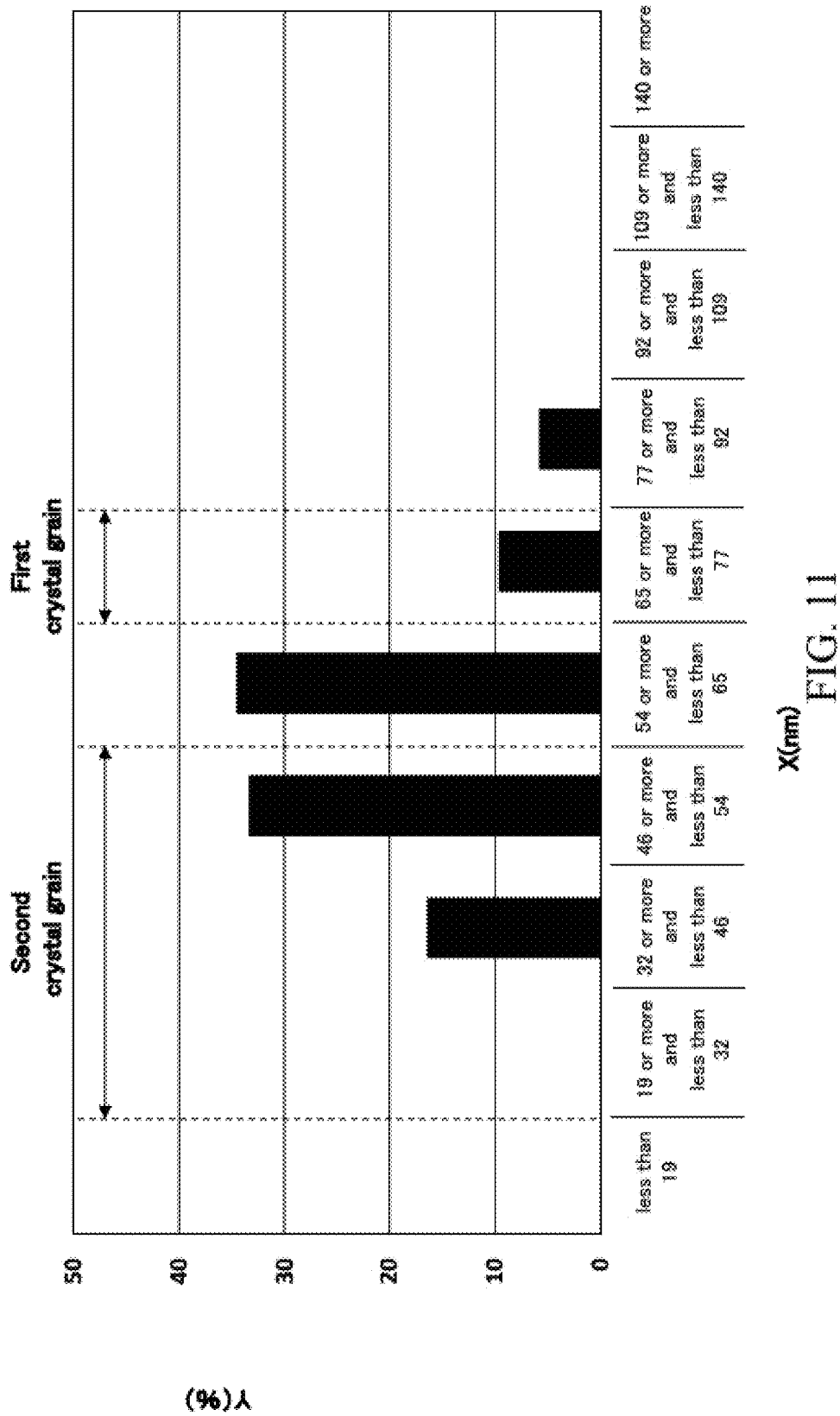
FIG. 11 is a graph showing a grain size distribution on a plane perpendicular to a film thickness direction of a dielectric thin film according to Comparative Example 8 of the present invention.

FIG. 3 shows the grain size distribution of Example 2, FIG. 4 shows the grain size distribution of Example 20, FIG. 5 shows the grain size distribution of Example 1, FIG. 7 shows the grain size distribution of Comparative Example 5, FIG. 8 shows the grain size distribution of Comparative Example 6, FIG. 9 shows the grain size distribution of Comparative Example 1, FIG. 10 shows the grain size distribution of Comparative Example 7, and FIG. 11 shows the grain size distribution of Comparative Example 8. In FIGS. 3 to 11, the X-axis represents the grain size [nm] and the Y-axis represents the number ratio [%].

The specific permittivity was evaluated by the following method. For a dielectric element including the obtained dielectric thin film having a thickness of 200 nm, the specific permittivity was calculated based on a capacitance measured under conditions of a reference temperature of 25° C. and a frequency of 1 kHz (1 Vrms), and the thickness of the dielectric thin film. Results are shown in Tables 1 and 2. A specific permittivity of 200 or more was evaluated as good.

The insulation resistance at a high temperature was measured by applying a DC voltage of 20 V at a reference temperature of 125° C. to the obtained dielectric thin film having a thickness of 200 nm using a digital ultra-high resistance tester (R8340A manufactured by ADVANTEST). Results are shown in Tables 1 and 2. Insulation resistance at a high temperature of $1 \times 10^6 \Omega$ or more was evaluated as good.

From Table 1, it is confirmed that the specific permittivity and/or the insulation resistance at a high temperature in a case where the number ratio of the first crystal grains is 20% or more and the number ratio of the second crystal grains is 40% or less among the crystal grains existing in a predetermined field of view (Examples 1 to 19) is higher than those in a case where the number ratio of the first crystal grains is less than 20% and/or in a case where the number ratio of the second crystal grains is more than 40% (Comparative Examples 1 to 4).

TABLE 1

| Sample number | Sr 1 − x | Ca x | Ti 1 − y | Hf y | O 3 − δ | N δ | (Sr + Ca)/ (Ti + Hf) m | Number ratio | | Most frequent value of grain size range (nm) | Specific permittivity | Insulation resistance at 125° C. (Ω) |
| --- | --- | --- | --- | --- | --- | --- | --- | --- | --- | --- | --- | --- |
| | | | | | | | | First crystal grains 65 nm or more and less than 77 nm | Second crystal grains 19 nm or more and less than 54 nm | | | |
| Example 1 | 0.99 | 0.01 | 0.85 | 0.15 | 2.97 | 0.03 | 1.00 | 28% | 32% | ≥65 nm, <77 nm | 310 | $2 \times 10^6$ |
| Example 2 | 0.95 | 0.05 | 0.90 | 0.10 | 2.97 | 0.03 | 1.00 | 26% | 22% | ≥65 nm, <77 nm | 280 | $7 \times 10^7$ |
| Example 3 | 0.90 | 0.10 | 0.95 | 0.05 | 2.97 | 0.03 | 1.00 | 24% | 35% | | 255 | $9 \times 10^7$ |
| Example 4 | 0.85 | 0.15 | 0.99 | 0.01 | 2.97 | 0.03 | 1.00 | 22% | 38% | | 220 | $4 \times 10^8$ |
| Example 5 | 0.90 | 0.10 | 0.90 | 0.10 | 2.97 | 0.03 | 1.00 | 27% | 28% | | 240 | $1 \times 10^8$ |
| Example 6 | 0.85 | 0.15 | 0.85 | 0.15 | 2.97 | 0.03 | 1.00 | 22% | 27% | | 210 | $2 \times 10^9$ |
| Example 7 | 0.87 | 0.13 | 0.99 | 0.01 | 2.97 | 0.03 | 1.00 | 20% | 26% | | 210 | $9 \times 10^7$ |
| Example 8 | 0.92 | 0.08 | 0.95 | 0.05 | 2.97 | 0.03 | 1.00 | 35% | 18% | | 310 | $4 \times 10^8$ |
| Example 9 | 0.95 | 0.05 | 0.88 | 0.12 | 2.97 | 0.03 | 1.00 | 34% | 38% | | 330 | $1 \times 10^8$ |
| Example 10 | 0.99 | 0.01 | 0.85 | 0.15 | 2.97 | 0.03 | 1.00 | 23% | 40% | | 250 | $4 \times 10^6$ |
| Example 11 | 0.85 | 0.15 | 0.99 | 0.01 | 2.99 | 0.01 | 1.00 | 24% | 28% | | 210 | $7 \times 10^7$ |
| Example 12 | 0.90 | 0.10 | 0.95 | 0.05 | 2.99 | 0.01 | 1.00 | 25% | 27% | | 255 | $1 \times 10^7$ |
| Example 13 | 0.95 | 0.05 | 0.90 | 0.10 | 2.99 | 0.01 | 1.00 | 27% | 26% | | 280 | $4 \times 10^6$ |
| Example 14 | 0.99 | 0.01 | 0.85 | 0.15 | 2.98 | 0.02 | 1.00 | 31% | 23% | | 280 | $2 \times 10^6$ |
| Example 16 | 0.95 | 0.05 | 0.95 | 0.05 | 2.97 | 0.03 | 0.90 | 25% | 26% | | 240 | $4 \times 10^6$ |
| Example 17 | 0.95 | 0.05 | 0.95 | 0.05 | 2.97 | 0.03 | 1.00 | 36% | 28% | | 330 | $4 \times 10^8$ |
| Example 18 | 0.95 | 0.05 | 0.95 | 0.05 | 2.97 | 0.03 | 1.10 | 31% | 29% | | 310 | $6 \times 10^8$ |
| Example 19 | 0.95 | 0.05 | 0.95 | 0.05 | 2.97 | 0.03 | 1.15 | 26% | 32% | | 235 | $1 \times 10^6$ |
| Comparative Example 1 | 0.99 | 0.01 | 0.85 | 0.15 | 2.97 | 0.03 | 1.00 | 11% | 61% | ≥46 nm, <54 nm | 180 | $7 \times 10^7$ |
| Comparative Example 2 | 0.90 | 0.10 | 0.90 | 0.10 | 2.97 | 0.03 | 1.00 | 21% | 46% | | 190 | $2 \times 10^8$ |
| Comparative Example 3 | 0.85 | 0.15 | 0.99 | 0.01 | 2.99 | 0.01 | 0.90 | 19% | 35% | | 310 | Unmeasurable |
| Comparative Example 4 | 0.95 | 0.05 | 0.95 | 0.05 | 2.97 | 0.03 | 1.15 | 22% | 47% | | 255 | $3 \times 10^5$ |

TABLE 2

| Sample number | Sr 1 − x | Ca x | Ti 1 − y | Hf y | O 3 − δ | N δ | (Sr + Ca)/ (Ti + Hf) M | Number ratio | | Most frequent value of grain size range (nm) | Specific permittivity | Insulation resistance at 125° C. (Ω) |
| --- | --- | --- | --- | --- | --- | --- | --- | --- | --- | --- | --- | --- |
| | | | | | | | | First crystal grains 65 nm or more and less than 77 nm | Second crystal grains 19 nm or more and less than 54 nm | | | |
| Example 20 | 0.90 | 0.10 | 0.95 | 0.05 | 2.97 | 0.03 | 1.00 | 20% | 36% | ≥54 nm, <65 nm | 250 | $2 \times 10^8$ |
| Comparative Example 5 | 0.85 | 0.15 | 0.99 | 0.01 | 2.97 | 0.03 | 1.00 | 0% | 85% | ≥46 nm, <54 nm | 250 | Unmeasurable |
| Comparative Example 6 | 0.90 | 0.10 | 0.90 | 0.10 | 2.97 | 0.03 | 1.00 | 8% | 65% | ≥46 nm, <54 nm | 235 | Unmeasurable |
| Comparative Example 7 | 0.85 | 0.15 | 0.85 | 0.15 | 2.97 | 0.03 | 1.00 | 8% | 72% | ≥46 nm, <54 nm | 195 | $1 \times 10^4$ |
| Comparative Example 8 | 0.87 | 0.13 | 0.99 | 0.01 | 2.97 | 0.03 | 1.00 | 10% | 50% | ≥54 nm, <65 nm | 265 | Unmeasurable |
| Example 23 | 0.84 | 0.16 | 0.98 | 0.02 | 2.97 | 0.03 | 1.00 | 20% | 36% | | 280 | $1 \times 10^8$ |
| Example 24 | 1.00 | 0.00 | 0.99 | 0.01 | 2.97 | 0.03 | 1.00 | 25% | 34% | | 320 | $5 \times 10^7$ |
| Example 25 | 0.98 | 0.02 | 0.84 | 0.16 | 2.97 | 0.03 | 1.00 | 27% | 28% | | 240 | $6 \times 10^8$ |
| Example 26 | 0.99 | 0.01 | 1.00 | 0.00 | 2.97 | 0.03 | 1.00 | 29% | 25% | | 280 | $6 \times 10^7$ |
| Example 27 | 0.85 | 0.15 | 0.99 | 0.01 | 3.00 | 0.00 | 1.00 | 31% | 24% | | 245 | $2 \times 10^7$ |
| Example 28 | 0.95 | 0.05 | 0.95 | 0.05 | 2.97 | 0.03 | 0.85 | 33% | 22% | | 250 | $3 \times 10^8$ |
| Example 29 | 0.85 | 0.15 | 0.90 | 0.10 | 2.97 | 0.03 | 1.00 | 60% | 5% | ≥65 nm, <77 nm | 310 | $3 \times 10^9$ |

Figure 12:
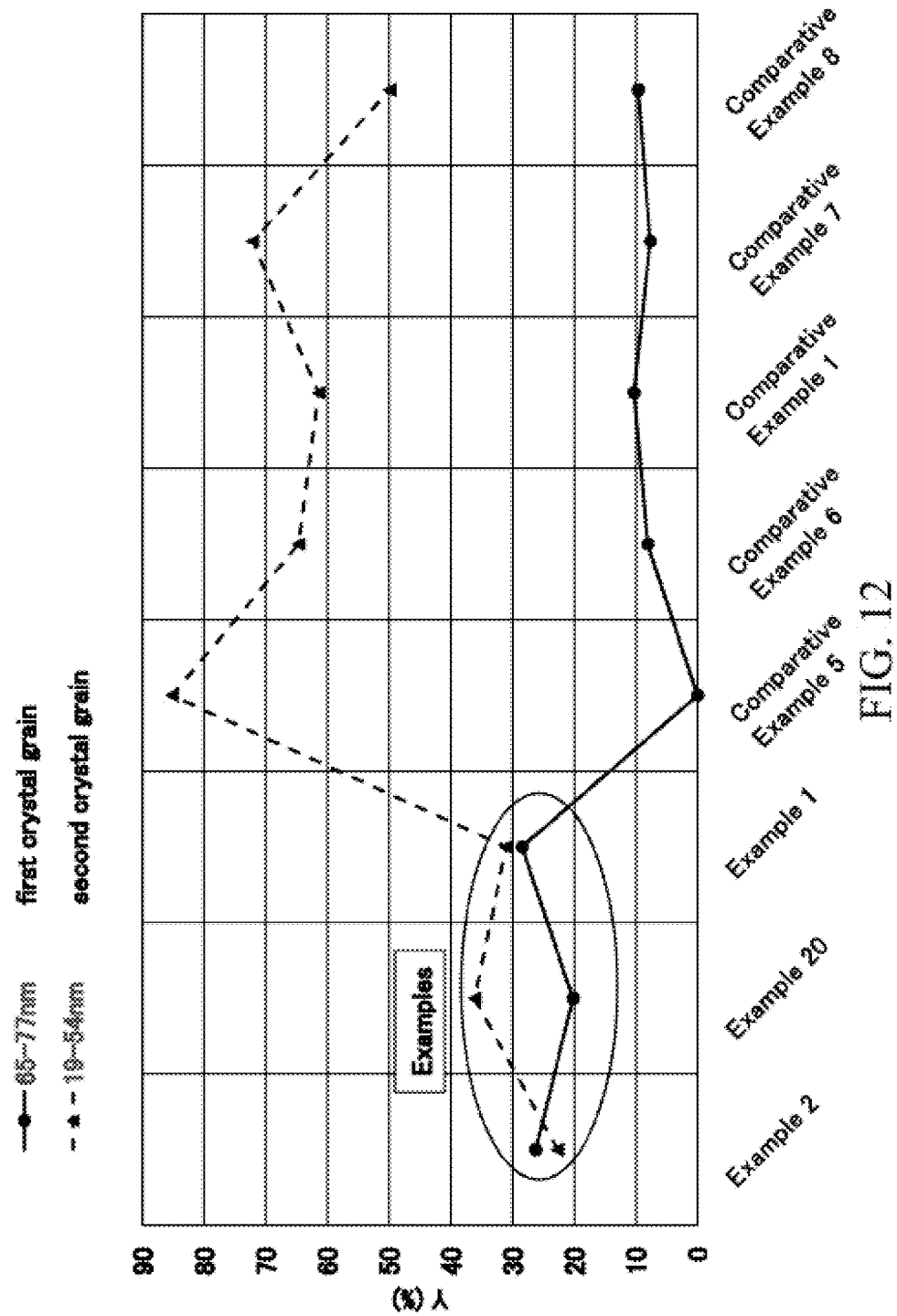
FIG. 12 is a graph relating to grain size distributions of Examples and Comparative Examples of the present invention.

In FIG. 12, the Y-axis represents the number proportion [%]. From FIG. 12, it is confirmed that there is a large difference in the distribution of the number ratio of the first crystal grains and the distribution of the number ratio of the second crystal grains between Examples 2, 20, and 1 and Comparative Examples 5, 6, 1, 7, and 8.

REFERENCE SIGNS LIST 1 thin film capacitor
11 substrate
12 first electrode
13 dielectric thin film
14 second electrode
90 electronic circuit board
91 thin film capacitor
30 first electrode
40 dielectric thin film
50 second electrode
52 through hole electrode
54, 56 extraction electrode
58 insulating resin layer
92 resin substrate
92a, 92b substrate
93 resin substrate
93a, 93b insulating resin layer
94 insulating coating layer
95 electronic component
96 metal wire

What is claimed is:

1. A dielectric thin film comprising Ca, Sr, Ti, Hf, O and N, wherein
    a number ratio of crystal grains having a grain size of 19 nm or more and less than 140 nm is 95% or more among crystal grains existing in a plane field of view of 1 μm square perpendicular to a film thickness direction of the dielectric thin film,
    a number ratio of first crystal grains having a grain size of 65 nm or more and less than 77 nm is 20% or more among the crystal grains existing in the plane field of view, and
    a number ratio of second crystal grains having a grain size of 19 nm or more and less than 54 nm is 40% or less among the crystal grains existing in the plane field of view.

2. The dielectric thin film according to claim 1, wherein a main component represented by a composition formula $(Sr_{1-x}Ca_x)_m(Ti_{1-y}Hf_y)O_{3-\delta}N_\delta$ is contained, in which
    $0 < x \leq 0.15$,
    $0 < y \leq 0.15$,
    $0.90 \leq m \leq 1.15$, and
    $0 < \delta \leq 0.05$ are satisfied.

3. A dielectric element comprising:
    the dielectric thin film according to claim 2.

4. The dielectric element according to claim 3, wherein the dielectric thin film is formed on an electrode, and the electrode comprises at least one selected from the group consisting of Pt, Ni, Cu and Pd.

5. An electronic circuit board comprising:
    the dielectric element according to claim 4.

6. An electronic circuit board comprising:
    the dielectric element according to claim 3.

7. A dielectric element comprising:
    the dielectric thin film according to claim 1.

8. The dielectric element according to claim 7, wherein the dielectric thin film is formed on an electrode, and the electrode comprises at least one selected from the group consisting of Pt, Ni, Cu and Pd.

9. An electronic circuit board comprising:
    the dielectric element according to claim 8.

10. An electronic circuit board comprising:
    the dielectric element according to claim 7.

* * * * *